US008734999B2

(12) United States Patent
Asari et al.

(10) Patent No.: US 8,734,999 B2
(45) Date of Patent: May 27, 2014

(54) CARBON NANOTUBE FORMING SUBSTRATE, CARBON NANOTUBE COMPLEX, ENERGY DEVICE, METHOD FOR MANUFACTURING ENERGY DEVICE, AND APPARATUS INCLUDING ENERGY DEVICE

(75) Inventors: Takuma Asari, Osaka (JP); Hironori Kumagai, Osaka (JP); Shigeo Hayashi, Kyoto (JP); Yasuhiro Hashimoto, Nara (JP); Naoki Yoshikawa, Osaka (JP); Takashi Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 492 days.

(21) Appl. No.: 13/145,310

(22) PCT Filed: Feb. 14, 2011

(86) PCT No.: PCT/JP2011/000809
§ 371 (c)(1), (2), (4) Date: Jul. 19, 2011

(87) PCT Pub. No.: WO2011/105021
PCT Pub. Date: Sep. 1, 2011

(65) Prior Publication Data
US 2012/0028123 A1 Feb. 2, 2012

(30) Foreign Application Priority Data
Feb. 24, 2010 (JP) ................................. 2010-038646

(51) Int. Cl.
| | | |
|---|---|---|
| H01M 4/583 | (2010.01) | |
| H01M 10/04 | (2006.01) | |
| H01M 4/139 | (2010.01) | |
| B05D 3/00 | (2006.01) | |
| H01G 9/00 | (2006.01) | |
| B82Y 40/00 | (2011.01) | |

(52) U.S. Cl.
USPC ............. 429/245; 429/231.8; 252/182.35; 29/623.1; 29/623.5; 29/25.03; 427/343; 361/502; 423/460; 423/445 R

(58) Field of Classification Search
USPC ......... 429/408–427, 517–522, 523–534, 535, 429/445; 361/502
See application file for complete search history.

(56) References Cited

U.S. PATENT DOCUMENTS

| | | |
|---|---|---|
| 6,628,053 B1 | 9/2003 | Den et al. |
| 6,720,728 B2 | 4/2004 | Den et al. |

(Continued)

FOREIGN PATENT DOCUMENTS

| | | |
|---|---|---|
| JP | 11-194134 | 7/1999 |
| JP | 2002-293521 | 10/2002 |
| JP | 2005-259760 | 9/2005 |

(Continued)

OTHER PUBLICATIONS

Suguru Noda et al., "Millimeter-Thick Single-Walled Carbon Nanotube Forests: Hidden Role of Catalyst Support," Japanese Journal of Applied Physics, 2007, vol. 46, No. 17, p. L399-L401.
Kenji Hata et al., "Water-Assisted Highly Efficient Synthesis of Impurity-Free Singled-Walled Carbon Nanotubes," Nov. 19, 2004, Science vol. 36, pp. 1362-1364.

*Primary Examiner* — Basia Ridley
*Assistant Examiner* — Caitlin Wilmot
(74) *Attorney, Agent, or Firm* — McDermott Will & Emery LLP

(57) ABSTRACT

Provided are a substrate on which carbon nanotubes each having one end connected to the substrate can be formed at a high synthetic rate and from which the carbon nanotubes are less likely to be peeled off. The substrate is a substrate for forming the carbon nanotubes and includes a buffer layer 13 formed on at least one of surfaces of a substrate main body 14 and containing aluminum atoms and fluorine atoms. The carbon nanotube complex includes the substrate and a plurality of carbon nanotubes 11 each having one end connected to a surface of the buffer layer 13.

13 Claims, 8 Drawing Sheets

(56) References Cited

U.S. PATENT DOCUMENTS

| | | |
|---|---|---|
| 2004/0116034 A1 | 6/2004 | Den et al. |
| 2006/0033415 A1 | 2/2006 | Den et al. |
| 2007/0205707 A1 | 9/2007 | Den et al. |
| 2008/0010796 A1 | 1/2008 | Pan et al. |
| 2008/0131779 A1* | 6/2008 | Kami et al. .................. 429/221 |
| 2008/0315745 A1 | 12/2008 | Den et al. |
| 2009/0232965 A1 | 9/2009 | Hata et al. |
| 2009/0301993 A1 | 12/2009 | Feng et al. |

FOREIGN PATENT DOCUMENTS

| | | |
|---|---|---|
| JP | 2008-522410 | 6/2008 |
| JP | 2009-078956 | 4/2009 |
| JP | 2007-230832 | 9/2009 |
| JP | 2009-208976 | 9/2009 |
| JP | 2009-292716 | 12/2009 |

* cited by examiner

CARBON NANOTUBE FORMING SUBSTRATE, CARBON NANOTUBE COMPLEX, ENERGY DEVICE, METHOD FOR MANUFACTURING ENERGY DEVICE, AND APPARATUS INCLUDING ENERGY DEVICE

RELATED APPLICATIONS

This application is the U.S. National Phase under 35 U.S.C. §371 of International Application No. PCT/JP2011/000809, filed on Feb. 14, 2011, which in turn claims the benefit of Japanese Application No. 2010-038646, filed on Feb. 24, 2010, the disclosures of which Applications are incorporated by reference herein.

TECHNICAL FIELD

The present invention relates to a carbon nanotube forming substrate, a carbon nanotube complex, an energy device, a method for manufacturing the energy device, and apparatus including the energy device.

BACKGROUND ART

Two main types of an energy device are an energy storage device and an energy generating device. Typical examples of the energy storage device are an electrochemical capacitor and a battery, which have already been used in their appropriate markets. Examples of the electrochemical capacitor are: an electric double layer capacitor which uses an activated carbon as a polarizable electrode active material and utilizes an electric double layer formed at an interface between a pore surface of the activated carbon and an electrolytic solution; and a redox capacitor which uses a transition metal oxide, such as ruthenium nitrate, whose valence continuously changes, and an electrically-conductive polymer which can be doped. Moreover, two main types of the battery are: a secondary battery which can be charged and discharged by utilizing intercalation and chemical reactions of active materials; and a primary battery which is basically not rechargeable after being discharged once.

The most basic component common to all of these various energy storage devices is an electrode active material which can discharge energy in principle. To take out the energy stored in the electrode active material, a current collector (electric conductor) is further required, which has electron conductivity and is electrically connected to the electrode active material. Since the current collector needs to transfer the energy of the electrode active material with high efficiency, a metallic material, such as aluminum, copper, or stainless steel, which is very low in resistance is typically used as the current collector. However, in the case of using the electrolytic solution, such as a sulfuric acid aqueous solution, which causes metal to corrode, for example, a rubber-based material to which electrical conductivity is given may be used as the current collector.

As the application of the energy storage device is increasing in recent years, there is a need for the energy storage device which has excellent properties, i.e., which is lower in resistance and can discharge higher current. First, these properties were expected of the electric double layer capacitor which was the lowest in resistance in principle among the energy storage devices, and the electric double layer capacitor having such properties was realized by disposing a carbon-based electrically-conductive layer on a joint surface between the electrode active material and the current collector. Since an electronic resistance in the electrode active material of the electric double layer capacitor is comparatively lower than those of the other secondary batteries, a contact resistance between the electrode active material and the current collector accounts for a nonnegligible percentage with respect to the resistance of the device, so that the carbon-based electrically-conductive layer is disposed on the joint surface. At present, similar technical trend to the above has been pursued for a lithium secondary battery.

To solve the above problems, an energy device has been studied, which uses carbon nanotubes, each having one end connected to the current collector, as the electrode active material (see Patent Document 1, for example). The carbon nanotube is a hollow carbon material having a minimum diameter of 0.4 nm and a maximum length of 4 mm. Unlike conventional pellet electrodes, a carbon nanotube electrode in which one end of each carbon nanotube is connected to a substrate does not require an electric conduction assisting material and a binding material. Therefore, the volume fraction of the active material in the carbon nanotube electrode is 100%. In addition, since the electrode active material and the current collector that is the substrate are connected to each other, the carbon nanotube electrode is very low in electrical resistance. Further, the carbon nanotube has an extremely high ideal specific surface area of 2,625 $m^2/g$, and is especially suitable to be applied to the electric double layer capacitor.

In recent years, it is reported that carbon nanotubes are synthesized at a high growth rate by forming an alumina (aluminum oxide) film as a buffer layer on a silicon substrate, further forming catalyst particles, and then introducing water as an oxidizing agent (see NPLs 1 and 2, for example). After these reports, in most of reported cases in each of which the carbon nanotubes are synthesized at a high growth rate, the alumina (aluminum oxide) film is used as the buffer layer.

In each of NPLs 1 and 2, after an alumina-containing buffer layer is formed on a high melting point substrate, such as a silicon substrate, and the carbon nanotubes are synthesized, only the carbon nanotubes are transferred to an aluminum substrate, and the obtained aluminum substrate is used as the electrode of the energy device.

CITATION LIST

Patent Literature

PTL 1: Japanese Laid-Open Patent Application Publication No. 2005-259760

Non Patent Literature

NPL 1: Science, 19, Nov. 2004, 1362-1364
NPL 2: Appl. Phys., Vol. 46, 2007, L399

SUMMARY OF INVENTION

Technical Problem

However, one problem of the carbon nanotube (hereinafter may be referred to as a "carbon nanotube complex") having one end connected to the substrate is that the carbon nanotube tends to be easily peeled off from the substrate, and the durability thereof is inadequate when using the carbon nanotube as the electrode of the energy device. Another problem is that since it takes time to synthesize the carbon nanotubes on the substrate, the manufacturing cost in an industrial process increases.

Here, an object of the present invention is to provide a substrate on which carbon nanotubes each having one end connected to the substrate can be formed at a high synthetic rate and from each of which the carbon nanotubes formed are less likely to be peeled off, and a carbon nanotube complex including the substrate. Another object of the present invention is to provide an energy device including this carbon nanotube complex as an electrode, an electronic device including the energy device, a transporting device including the energy device, a method for manufacturing the carbon nanotube complex, and a method for manufacturing the energy device.

Solution to Problem

To solve the above problems, the present inventors have diligently studied. As a result, the present inventors have surprisingly found that the above problems can be solved by forming an aluminum fluoride layer or aluminum fluoride particles between the surface of the substrate and catalyst metal particles that are origins of carbon nanotube synthesis. Thus, the present invention was made.

That is, a first aspect of the present invention relates to a substrate for forming carbon nanotubes, the substrate including: a substrate main body; and a buffer layer formed on at least one of surfaces of the substrate main body and including aluminum atoms and fluorine atoms.

A second aspect of the present invention relates to a carbon nanotube complex including: a substrate main body; a buffer layer formed on at least one of surfaces of the substrate main body and including aluminum atoms and fluorine atoms; and a plurality of carbon nanotubes, each having one end connected to a surface of the buffer layer.

Preferably, the buffer layer is constituted by an aluminum fluoride layer or aluminum fluoride particles.

Preferably, the aluminum fluoride layer or the aluminum fluoride particles has a composition represented by a formula: $AlF_x$ (where x satisfies $0<x<3.9$).

Preferably, the substrate main body is made of aluminum. With this, in a case where the carbon nanotube complex is used as the electrode of the energy device, and a voltage is applied to the electrode, metal ions are less likely to flow out by the reaction with the electrolytic solution. In addition, since aluminum is inexpensive and excels in bending workability, it is preferably used in the rolled-structure energy device. However, in the case of using the carbon nanotube complex in applications other than the energy device, the substrate made of a metal other than aluminum may be more preferable. A preferable substrate made of, for example, copper, nickel, stainless steel, or iron, can be used depending on use applications. Here, the substrate made of aluminum may contain a small amount of metal other than aluminum.

A third aspect of the present invention is an energy device including at least a pair of electrode bodies constituted by a positive electrode and a negative electrode, wherein at least one of the positive electrode and the negative electrode is the carbon nanotube complex.

Preferably, the energy device is an electric double layer capacitor, a pseudo capacitor, a lithium ion capacitor, or a lithium ion secondary battery.

A fourth aspect of the present invention is an electronic device or a transporting device including the energy device.

A fifth aspect of the present invention is a method for manufacturing a carbon nanotube complex, the method including the steps of: forming an aluminum fluoride layer or aluminum fluoride particles on at least one of surfaces of a substrate main body; forming catalyst metal particles on a surface of the aluminum fluoride layer or on surfaces of the aluminum fluoride particles; and synthesizing carbon nanotubes by using the catalyst metal particles as origins.

Preferably, the aluminum fluoride layer or the aluminum fluoride particles has a composition represented by a formula: $AlF_x$ (where x satisfies $0<x<3.9$).

A sixth aspect of the present invention is a method for manufacturing an energy device, the method including the steps of: forming an aluminum fluoride layer or aluminum fluoride particles on at least one of surfaces of a substrate main body; forming catalyst metal particles on a surface of the aluminum fluoride layer or on surfaces of the aluminum fluoride particles; synthesizing carbon nanotubes by using the catalyst metal particles as origins to produce a carbon nanotube complex; producing an element by stacking or rolling a positive electrode and a negative electrode with a separator interposed therebetween, the positive electrode and the negative electrode being opposed to each other, at least one of the positive electrode and the negative electrode being the carbon nanotube complex; storing the element in a case together with a driving electrolytic solution; and sealing an opening of the case.

Preferably, the aluminum fluoride layer or the aluminum fluoride particles has a composition represented by a formula: $AlF_x$ (where x satisfies $0<x<3.9$).

Advantageous Effects of Invention

The present invention can provide: the substrate on which the carbon nanotubes each having one end connected to the substrate can be formed at a high synthetic rate and from which the carbon nanotubes are less likely to be peeled off; the carbon nanotube complex including the substrate; and the energy device including the carbon nanotube complex as the electrode.

DESCRIPTION OF EMBODIMENTS

Figure 1:
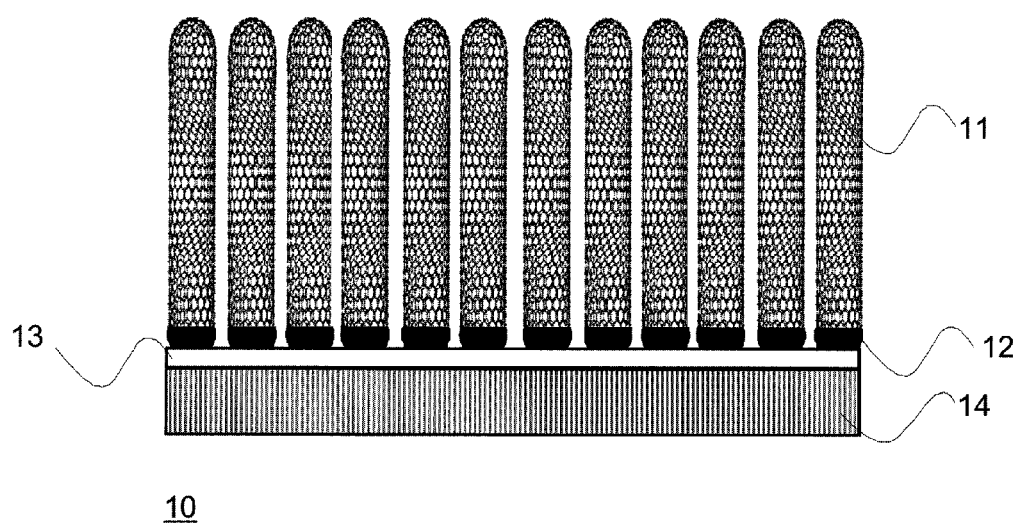
FIG. 1 is a cross-sectional conceptual diagram of a carbon nanotube complex of an embodiment of the present invention.

The present embodiment relates to carbon nanotubes each having one end connected to a substrate, that is, to a carbon nanotube complex. However, the carbon nanotube complex of the present invention is not limited to a carbon nanotube complex in which one end of each of the carbon nanotubes directly contacts the surface of the substrate. An aluminum fluoride layer or aluminum fluoride particles, and catalyst metal particles are formed in this order on the surface of a substrate main body. To be specific, the carbon nanotube complex of the present embodiment includes: the substrate main body; the aluminum fluoride layer or the aluminum fluoride particles disposed on the substrate main body; the catalyst metal particles disposed on the aluminum fluoride layer or the aluminum fluoride particles; and a plurality of carbon nanotubes each having one end connected via the catalyst metal particle to the aluminum fluoride layer or the aluminum fluoride particle. That is, one ends of the carbon nanotubes are respectively connected to the catalyst metal particles. The other ends and side surfaces of the carbon nanotubes are not connected to the surface of the substrate.

The carbon nanotube complex of the present invention is applicable as an electrode body in all types of energy storage devices, such as an electric double layer capacitor, an electrochemical capacitor, a lithium ion capacitor, a lithium ion secondary battery, an organic battery, and a pseudo capacitor using an oxidized metal or an electrically-conductive polymer. Here, the energy device of the present invention is not especially limited as long as at least one of electrodes included in the energy storage device is constituted by the carbon nanotube complex of the present invention. Hereinafter, the electrode body constituted by the carbon nanotubes of the present invention may be referred to as a "carbon nanotube electrode".

In each of the electric double layer capacitor and the electrochemical capacitor, the carbon nanotube electrode can be used as each of both positive and negative electrodes.

In the lithium ion secondary battery, typically, a silicon compound, a lithium metal, or a lithium oxidized metal, such as a lithium cobalt oxide, is used as a positive-electrode active material, and graphite or the like is used as a negative-electrode active material. The carbon nanotube has the same graphene structure as the graphite. Therefore, in the present invention, the carbon nanotube electrode can be used as the negative electrode instead of a graphite-containing electrode. Moreover, in the positive electrode, the carbon nanotube can be used as a supporting material of the active material. To be specific, the carbon nanotube electrode supporting the above positive-electrode active material can be used as the positive electrode.

In the lithium ion capacitor, an activated carbon is suggested as the positive-electrode active material, and the graphite is suggested as the negative-electrode active material. Therefore, the carbon nanotube electrode can be used as one of the positive and negative electrodes or as each of both the positive and negative electrodes.

In the organic battery, an organic material is suggested to be used as the active material of at least one of the positive and negative electrodes. Therefore, the carbon nanotube can be used as the supporting material of the organic material. To be specific, the carbon nanotube electrode supporting the active material can be used as at least one of the positive and negative electrodes.

As described above, in the present invention, the carbon nanotube contained in the carbon nanotube complex may serve as the electrode active material or may serve as the supporting material of the other electrode active material.

An average diameter of the carbon nanotubes is in a range from about 0.1 to 100 nm. Considering that a lithium ion having an ion radius of 0.074 nm or an electrolyte ion having an ion radius of about 0.5 nm gets into the carbon nanotube, the average diameter of the carbon nanotubes is desirably in a range from 0.1 to 10 nm, and more desirably in a range from 0.1 to 5 nm.

It is preferable that a distance between the carbon nanotubes be short. This is because the carbon nanotube density per unit area becomes high. However, it is desirable that the distance between the carbon nanotubes be an adequate distance for the electrolyte ions of an electrolytic solution to move therethrough.

Hereinafter, embodiments of the present invention will be explained in reference to the drawings. The same reference signs are used for the same components, and a repetition of the same explanation is avoided.

Embodiment 1

Carbon Nanotube Complex

First, the structure of the carbon nanotube complex of the present embodiment will be explained.

FIG. 1 is a cross-sectional conceptual diagram of the carbon nanotube complex of the present embodiment.

As shown in FIG. 1, a carbon nanotube complex 10 of the present embodiment includes a substrate main body 14, a buffer layer 13, catalyst metal particles 12, and carbon nanotubes 11. A substrate of the present embodiment includes the substrate main body 14 and the buffer layer 13.

The buffer layer 13 is formed on the substrate main body 14. The catalyst metal particles 12 are formed on the buffer layer 13. One ends of the carbon nanotubes 11 are respectively connected to the catalyst metal particles 12.

In the present embodiment, the substrate main body 14 is not especially limited. A metal substrate can be used as the substrate main body 14. Among metals, a substrate formed by aluminum, copper, stainless steel, nickel, or titanium is preferable. Moreover, the substrate main body 14 may be formed by stacking two or more types of metal plates. Further, the substrate main body 14 may be a glass substrate or a semiconductor substrate, such as a silicon substrate or a sapphire substrate.

Among the above substrates, the substrate formed by aluminum is used as a current collector of an electric double layer capacitor including an activated carbon as an electrode active material. Therefore, the substrate formed by aluminum can be especially preferably used as the substrate main body 14 in the present invention. The substrate formed by aluminum may contain other elements as long as it contains aluminum as a major constituent element.

The thickness of the substrate main body 14 is not especially limited but is, for example, 10 to 100 μm.

The buffer layer 13 contains an aluminum fluoride-containing layer or aluminum fluoride-containing particles. In FIG. 1, the buffer layer 13 is shown in the shape of a layer. However, the shape of the buffer layer 13 is not limited to this. The buffer layer 13 may be particles that are a plurality of minute particles formed on the surface of the substrate main body 14.

It is preferable that the aluminum fluoride in the buffer layer 13 have a composition represented by a formula: AlFx where a value x satisfies 0<x<3.9, that is, the value x denotes a positive number smaller than 3.9. It is preferable that the value x be not less than 0.8 and not more than 2.7. The value x is calculated from the ratio of atom concentrations of respective elements by X-ray photoelectron spectroscopy (XPS). The value x satisfies a formula: x=(fluorine atom concentration)/(aluminum atom concentration). Normally, aluminum forms a trivalent ion. Therefore, the aluminum fluoride forms a stable crystal structure when a composition formula is $AlF_3$. However, in an atom concentration conversion by the XPS, a concentration conversion error by a relative sensitivity coefficient is about 20 to 30%. Therefore, when $AlF_3$ crystal is analyzed by the XPS, the obtained value x may become 3.9 at most. Therefore, the upper limit of the value x is set to 3.9.

The buffer layer 13 is a layer containing aluminum atoms and fluorine atoms. However, the buffer layer 13 may be particles containing aluminum atoms and fluorine atoms. The buffer layer 13 may be formed only by the aluminum fluoride-containing layer or the aluminum fluoride-containing particles. Or, the buffer layer 13 may be formed by stacking a layer formed by alumina ($Al_2O_3$) and the aluminum fluoride-containing layer or by stacking the layer formed by alumina ($Al_2O_3$) and the aluminum fluoride-containing particles. In this case, the layer formed by alumina is stacked on the surface of the substrate main body 14, and the aluminum fluoride-containing layer or the aluminum fluoride-containing particles is stacked on the layer formed by alumina.

The thickness of the buffer layer 13 is not especially limited.

The catalyst metal particles 12 form a layer formed by a plurality of catalyst metal particles. The catalyst metal is a metal conventionally used for standing and synthesizing the carbon nanotubes. Specific examples of the catalyst metal are metals, such as nickel, iron, cobalt, zinc, molybdenum, gold, silver, and copper, alloys of these metals, oxides of these metals, and carbides of these metals. The catalyst metal particles 12 are suitably selected depending on a desired carbon nanotube diameter and a carbon nanotube synthetic method.

The catalyst metal particles on the surface of the buffer layer 13 increase in size by heating at the time of the synthesis of the carbon nanotubes or by preheating performed before the synthesis of the carbon nanotubes. Here, it is reported that the diameter of the catalyst metal particle and the diameter of the synthesized carbon nanotube are correlated to each other. Therefore, if the desired diameter of the carbon nanotube is 1 to 100 nm, it is desirable that the diameter of the catalyst metal particle be adjusted to 1 to 100 nm.

The carbon nanotubes 11 stand on the surface of the substrate using respective catalyst metal particles of the catalyst metal particles 12 as origins. One end of each carbon nanotube may be connected to the surface of the substrate, and the carbon nanotube does not have to be arranged strictly perpendicular to the substrate as shown in FIG. 1. The carbon nanotube is an extremely minute tubular material formed by binding carbon atoms in a mesh-like pattern and having a nanometer-size hole diameter. The carbon nanotube may be formed by one layer, that is, one tube. Or, the carbon nanotube may be formed by a plurality of layers, that is, a plurality of concentric tubes having different diameters.

The diameter of the carbon nanotube is not limited. In a case where the carbon nanotube complex of the present embodiment is used as the electrode of the electric double layer capacitor, the lithium ion having the ion radius of 0.074 nm and the electrolyte ion having the ion radius of about 0.5 nm are assumed to get into the carbon nanotube. Therefore, it is preferable that the diameter of the carbon nanotube be in a range from 0.1 to 10 nm, and it is more preferable that the diameter of the carbon nanotube be in a range from 0.1 to 3 nm.

In FIG. 1, the buffer layer 13, the catalyst metal particles 12, and the carbon nanotubes 11 are formed only on one surface of the substrate main body 14. However, the present invention is not limited to this. The buffer layer may also be formed on a rear surface of the substrate main body 14.

The carbon nanotube complex of the present invention is not easily peeled off from the substrate and can obtain adequate durability when used as the electrode of the energy device.

Manufacturing Method

A manufacturing method of the present embodiment for manufacturing the carbon nanotube complex of the present invention will be explained in detail.

The manufacturing method of the present embodiment includes the steps of: forming the buffer layer 13 on the substrate main body 14; further forming the catalyst metal particles 12; and synthesizing the carbon nanotubes 11 on the surface of the substrate using the catalyst metal particles 12 as origins.

The step of forming the buffer layer 13 on the substrate main body 14 can include the steps of: preparing the substrate main body 14 having a surface on which an alumina (aluminum oxide) layer is formed; and fluorinating a surface of the alumina layer.

The step of preparing the substrate main body 14 having the surface on which the alumina layer is formed varies depending on the type of the material forming the substrate main body 14.

In a case where the substrate main body 14 is formed by aluminum, the alumina layer is formed by oxidizing the surface of the aluminum substrate. Examples of the oxidizing method are thermal oxidation and steam oxidation. The aluminum substrate having the surface on which the alumina layer is formed by natural oxidation can be used as the substrate main body 14.

In a case where the substrate main body 14 is formed by a material other than aluminum, an aluminum layer is formed on the substrate main body 14 by, for example, CVD, and the alumina layer can be then formed by oxidizing the surface of the aluminum layer by the above-described method. Moreover, the alumina layer can be directly formed on the surface of the substrate main body 14 by, for example, reactive sputtering.

The step of fluorinating the surface of the alumina layer can be performed by an electrochemical method or a method using a fluorine plasma treatment. In the method using the fluorine plasma treatment, the substrate main body 14 having the surface on which the alumina layer is formed is placed in a chamber, a carbon tetrafluoride ($CF_4$) gas is introduced into the chamber, high-frequency induction plasma is then generated in the chamber, and the alumina layer on the surface of the substrate main body 14 is irradiated with fluorinated radicals excited by the plasma. Therefore, the surface of the alumina layer can be fluorinated. Thus, the buffer layer 13 is formed. The thickness of the buffer layer 13 is not especially limited but is not less than 3 nm and less than 10 nm. In this case, the composition (the value x of AlFx) of the aluminum fluoride-containing layer or the aluminum fluoride-containing particles can be adjusted by changing four parameters that are treatment pressure, the flow rate of the carbon tetrafluoride ($CF_4$) gas, antenna power/bias power, and a treatment time.

As above, by the step of forming the buffer layer 13 on the substrate main body 14, a substrate is formed, which is used to form the carbon nanotubes and is formed such that the buffer layer containing the aluminum atoms and the fluorine atoms is formed on at least one of the surfaces of the substrate. The synthetic rate of the carbon nanotubes can be increased by forming the carbon nanotubes using this substrate.

Next, in the step of forming the catalyst metal particles 12, the catalyst metal particles 12 are formed on the buffer layer 13. The catalyst metal particles 12 can be formed using a conventional method by depositing the catalyst metals on the buffer layer 13 by electron beam heating.

In the step of synthesizing the carbon nanotubes on the surface of the substrate using the catalyst metal particles 12 as the origins, the carbon nanotubes 11 are synthesized using the catalyst metal particles 12 as catalysts. Specifically, first, the substrate having the surface on which the catalyst metal particles 12 and the buffer layer 13 are formed is placed on a substrate holder in a chamber of a carbon nanotube synthesizer, and the degree of vacuum in the chamber is reduced up to less than $10^{-2}$ Torr. Then, a reducing gas and a hydrocarbon gas, such as a methane gas, which becomes a carbon material are introduced to the chamber until the internal pressure of the chamber reaches 20 Torr. The reducing gas is a gas containing a hydrogen gas as a major component. In addition to the hydrogen gas, the reducing gas may contain gases, such as CO, $H_2S$, $SO_2$, $H_2$, and HCHO (formaldehyde). The reducing gas is used for the purpose of stabilizing subsequent plasma generation and removing amorphous carbon generated when forming the carbon nanotubes. Then, the substrate holder is increased in temperature by resistance heating. Microwave-excited plasma is generated when the temperature of the substrate holder has reached a temperature (400 to 900° C.; in the case of using the aluminum substrate, 660° C. (melting point of aluminum) or lower) most suitable for the synthesis of the carbon nanotubes. After the hydrocarbon radicals generated in the plasma reach the catalyst metal particles, the synthesis of the carbon nanotubes 11 starts.

In the present invention, the synthetic rate of the carbon nanotubes can be increased by using the substrate including the buffer layer 13.

With this, it is possible to provide the carbon nanotube complex having high durability while reducing the manufacturing cost. As a result, it is also possible to provide the energy device using the carbon nanotube complex and having high durability while reducing the manufacturing cost.

Figure 7:
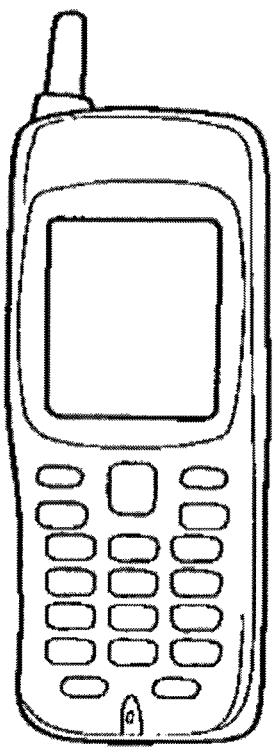
FIG. 7 is a conceptual diagram showing a mobile phone including an energy device having the carbon nanotube complex of the present invention.
Figure 8:
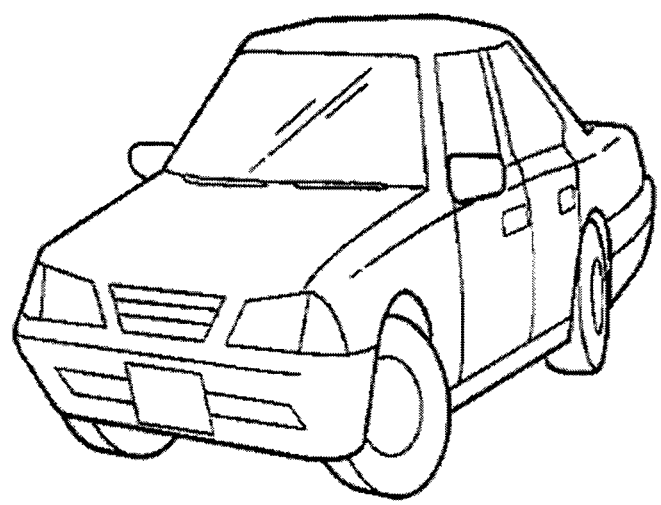
FIG. 8 is a conceptual diagram showing an automobile including the energy device having the carbon nanotube complex of the present invention.

To be specific, since the carbon nanotube electrode can be provided at low cost, it is possible to reduce the manufacturing costs of portable devices, such as mobile phones, having a wireless communication function, information processing terminals, such as notebook computers, and transporting devices, such as hybrid automobiles. FIG. 7 is a conceptual diagram showing one example of an electronic device including the energy device having the carbon nanotube complex of the present invention. FIG. 8 is a conceptual diagram showing one example of a transporting device including the energy device. Here, a reference sign 30 denotes a mobile phone that is one example of the electronic device, and a reference sign 40 denotes an automobile that is one example of the transporting device.

Embodiment 2

The present embodiment will explain a rolled-structure energy device 20 including at least a pair of rolled electrode bodies, each of which is the carbon nanotube complex 10.

Figures 2A, 2B:
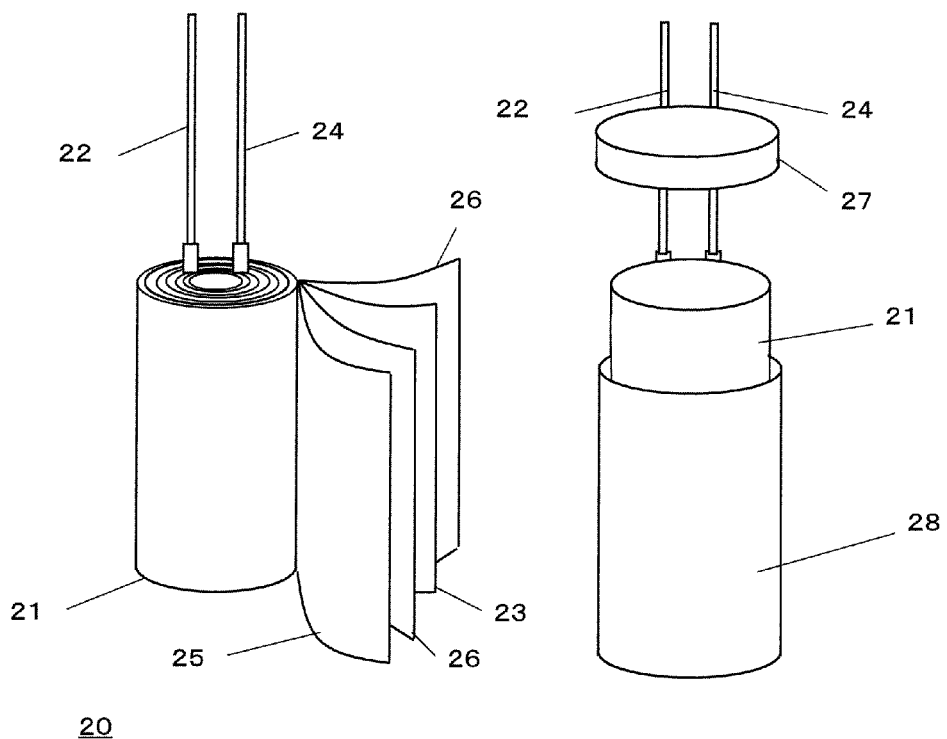
FIG. 2 is a perspective view of a rolled-type energy device of the embodiment of the present invention.

FIG. 2A is a perspective view showing a state where the electrode body is rolled in the rolled-structure energy device 20 of the present embodiment. FIG. 2B is a perspective view showing a state where the rolled electrode body is integrated with a sealing member and inserted into a metal case.

An energy device element 21 is formed by rolling an anode 23 and a cathode 25 with a separator 26 interposed therebetween. An anode lead wire 22 is connected to the anode 23, and a cathode lead wire 24 is connected to the cathode 25. A sealing member 27 made of rubber is attached to the anode lead wire 22 and cathode lead wire 24 of the energy device element 21. After the energy device element 21 is impregnated with a driving electrolytic solution, it is stored in a bottomed cylindrical metal case 28 made of aluminum. By this storing, the sealing member 27 is located at an opening of the metal case 28. Then, by carrying out horizontal drawing and curling with respect to the opening of the metal case 28, the sealing member 27 is attached to the opening of the metal case 28 to seal the opening of the metal case 28.

In the energy device of the present invention, the carbon nanotube complex of the present invention is used as one of the anode 23 and the cathode 25 or as each of both the anode 23 and the cathode 25. Moreover, in a case where the anode 23 or the cathode 25 is formed by a plurality of electrode bodies, at least one of the electrode bodies may be the carbon nanotube complex of the present invention.

A physical property required for a separator does not depend on the type of the energy device in principle. However, in a case where reflow especially needs to be carried out, heat resistance is required as the physical property of the separator. In a case where the heat resistance is not required for the separator, a synthetic polymer material, such as polypropylene, may be used for the separator, and in a case where the heat resistance is required for the separator, a cellulose-based material may be used for the separator. The thickness of the separator is not especially limited but is about 10 to 50 μm.

The material of the electrolytic solution can be selected depending on the type of the energy device. To prevent electrochemical decomposition from being caused by a working voltage range, a solvent having an appropriate potential window is selected as a solvent contained in the electrolytic solution. Generally, propylene carbonate, ethylene carbonate, ethyl methyl carbonate, or a mixed solvent thereof can be used. In a case where the reflow needs to be carried out for soldering, a high boiling point solvent, such as sulfolane, can be used to prevent the electrolytic solution from boiling at the time of the reflow.

As an electrolyte contained in the electrolytic solution, various known materials can be used. For example, in the electric double layer capacitor, tetraethylammonium tetrafluoroborate can be used as the electrolyte. In the lithium ion secondary battery, lithium pentafluorophosphate or the like can be used as the electrolyte. By synthesizing the carbon nanotubes each having the diameter corresponding to the ion diameter of the above ionic electrolyte, it is possible to manufacture the energy storage device having the highest energy density per unit weight. For example, the electrolytic solution (LIPASTE-P/EAF069N produced by Tomiyama Pure Chemical Industries, Ltd., Concentration of 0.69 M) containing propylene carbonate as the solvent and tetraethyl acetate-.tetrafluoroborate as the electrolyte can be used.

The present embodiment has explained the rolled-type energy device but is not limited to this. The energy device of the present embodiment may be a stack type including stacked electrode bodies, not the rolled electrode bodies.

EXAMPLES

Hereinafter, the present invention will be specifically explained using Examples. However, the present invention is not limited to Examples below.

Manufacture of Carbon Nanotube Complex

In Example (Samples A to K), an aluminum substrate was used as the substrate main body 14, and the buffer layers 13 were respectively formed on both surfaces of the substrate by fluorinating these surfaces by the above-described method using the fluorine plasma treatment. The alumina layers had been respectively formed on the surfaces of the aluminum substrate by the natural oxidation. In the fluorination treatment, various conditions (the treatment pressure, the flow rate of the carbon tetrafluoride ($CF_4$) gas, the antenna power/bias power, and the treatment time) shown in Table 1 were selected. Thus, eleven substrate samples were obtained, each of which was formed such that the buffer layers containing the aluminum atoms and the fluorine atoms were respectively formed on the surfaces of the aluminum substrate.

In Example (Samples L and M), a silicon substrate was used as the substrate main body 14. After aluminum was deposited by 10 nm on the surface of the substrate by electron beam evaporation, the alumina layer was formed by the natural oxidation in the atmosphere, and the alumina layer was fluorinated by the above-described method using the fluorine plasma treatment. Thus, the buffer layer 13 was formed. In the fluorination treatment, various conditions (the treatment pressure, the flow rate of the carbon tetrafluoride ($CF_4$) gas, the antenna power/bias power, and the treatment time) shown in Table 1 were selected. Thus, two substrate samples were obtained, each of which was formed such that the buffer layer containing the aluminum atoms and the fluorine atoms is formed on the surface of the silicon substrate.

TABLE 1

| Samples | Type of Substrate | Surface Status | Treatment Pressure (Pa) | Flow Rate of CF4 (sccm) | Antenna Power (W)/Bias Power (W) | Time (sec) |
|---|---|---|---|---|---|---|
| Sample A | Al | AlFx | 1 | 10 | 500/20 | 5 |
| Sample B | Al | AlFx | 1 | 10 | 500/20 | 10 |
| Sample C | Al | AlFx | 1 | 10 | 500/20 | 30 |
| Sample D | Al | AlFx | 1 | 10 | 500/20 | 60 |
| Sample E | Al | AlFx | 1 | 10 | 500/20 | 600 |
| Sample F | Al | AlFx | 1 | 50 | 900/250 | 60 |
| Sample G | Al | AlFx | 1 | 50 | 900/250 | 600 |
| Sample H | Al | AlFx | 10 | 10 | 900/250 | 60 |
| Sample I | Al | AlFx | 10 | 10 | 900/250 | 600 |
| Sample J | Al | AlFx | 10 | 50 | 500/20 | 60 |
| Sample K | Al | AlFx | 10 | 50 | 500/20 | 600 |
| Reference 1 | Al | Al2O3 | — | — | — | — |
| Reference 2 | Al | Al2O3 | — | — | — | — |
| Sample L | Si | AlFx | 1 | 50 | 900/0 | 60 |
| Sample M | Si | AlFx | 1 | 50 | 900/0 | 600 |
| Reference 3 | Si | Al2O3 | — | — | — | — |

In Table 1, the treatment pressure denotes the pressure of the $CF_4$ gas in a fluorination treatment chamber. The flow rate (sccm) of $CF_4$ denotes the amount of $CF_4$ gas introduced into the fluorination treatment chamber per unit time. The antenna power (W) denotes the energy necessary to generate plasma, and the bias power (W) denotes the energy necessary to move the generated plasma in a substrate direction. The time (sec) denotes a plasma treatment time.

In Comparative Example (References 1 and 2), two types of aluminum substrates, each having the surfaces on which the alumina layers were respectively formed by the natural oxidation, were used as the substrate samples.

Moreover, in Comparative Example (Reference 3), used as the substrate sample was a silicon substrate on which aluminum was deposited by 10 nm by the electron beam evaporation and the alumina layer was then formed by the natural oxidation in the atmosphere.

In each of Example and Comparative Example, the catalyst metal particles were formed by an ordinary method on the surface of the substrate sample prepared as above. In this case, Fe was used as a metal catalyst for the synthesis of the carbon nanotube.

Next, the synthesis of the carbon nanotube was performed in accordance with the above-described method. In this case, the methane gas was used as the hydrocarbon gas, and the hydrogen gas was used as the reducing gas. The microwave-excited plasma was generated when the temperature of the substrate holder reached 615° C. After the temperature of the substrate holder was increased up to 655° C., it was maintained during the synthesis of the carbon nanotubes. A synthesis time of the carbon nanotubes was set to 90 minutes.

Thus, the carbon nanotube complexes of Example and Comparative Example were manufactured.

Measurement Result of X-Ray Photoelectron Spectroscopy Spectrum

Measured were X-ray photoelectron spectroscopy (XPS) spectrums of respective substrates, each of which was subjected to the fluorination treatment and on each of which the catalyst metal particles were not yet formed.

Figure 3:
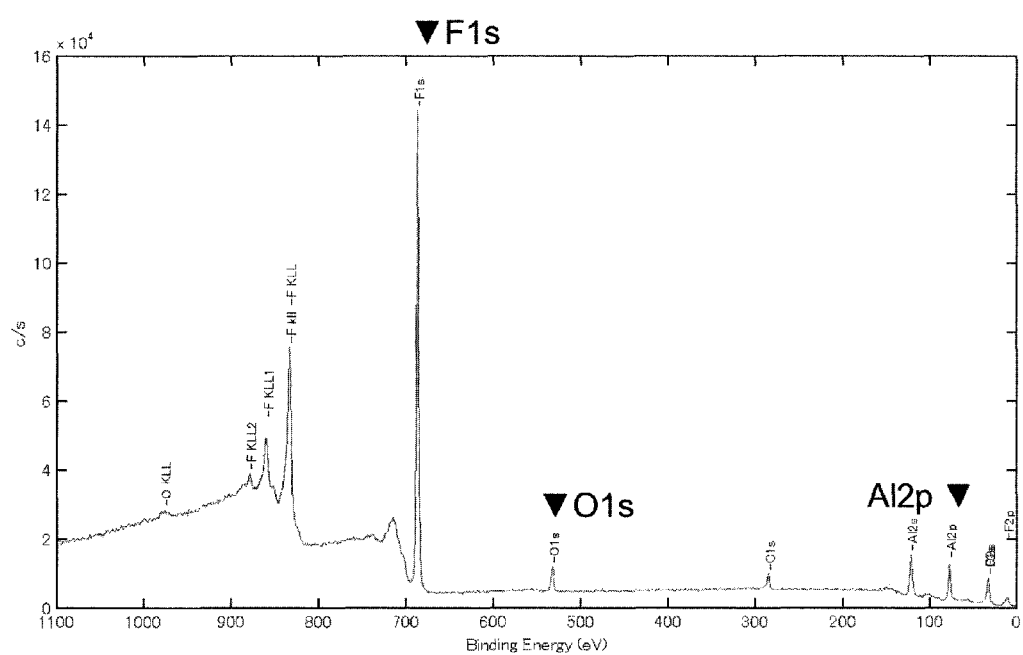
FIG. 3 shows an X-ray photoelectron spectroscopy spectrum of an aluminum fluoride layer of Example.

FIG. 3 shows the X-ray photoelectron spectroscopy spectrum of Sample A of Example. By wide scan of 0 to 1,100 eV, peaks of Al2p, O1s, and F1s were observed. These peaks were further measured by narrow scan based on finer energy spacing. After integrated areas of respective peaks of Al2p and F1s were calculated, these peak areas were converted into the concentrations by using relative sensitivity coefficients provided by a XPS device maker (Quantera SXM Ulvac-phi, Inc.) to obtain respective atom concentrations. Based on these, the value x of $AlF_x$ was obtained. In the case of Sample A, an Al atom concentration calculated from an Al2p peak area was 15.92 atm %, and an F atom concentration calculated from an F1s peak area was 18.15 atm %. Therefore, the value x was 1.11.

Normally, the alumina layer that is a naturally oxidized film is formed on the surface of the aluminum substrate at ordinary temperature and normal pressure. Therefore, if the treatment time of the above fluorination treatment conditions shown in Table 1 is short, the amount of alumina detected becomes large, and the amount of aluminum fluoride detected becomes small. The surface of each of the substrates (Samples A to K) subjected to the fluorination treatment contains an $Al_2O_3$ crystal structure and an $AlF_3$ crystal structure. The difference between the $Al_2O_3$ crystal structure and the $AlF_3$ crystal structure can be determined based on the difference between their Al2p binding energies by XPS. Here, the Al2p binding energy in $AlF_3$ is 76.3 eV, the Al2p binding energy in $Al_2O_3$ is 74.4 to 74.7 eV, the Al2p binding energy in Al is 72.9 eV, and the Al2p binding energy in $Al(OH)_3$ is 74.0 to 74.2 eV.

Relation Between Value x of AlFx and Carbon Nanotube Synthetic Rate

In accordance with the above method, the value x of $AlF_x$ of each of the samples was obtained by utilizing the)(PS spectrums.

Further, the thickness of a carbon nanotube layer of the carbon nanotube complex of each of the samples was measured by a color 3D laser microscope (VK-9700 produced by Keyence Corporation). The obtained thickness was divided by the synthesis time of the carbon nanotube to obtain the carbon nanotube synthetic rate of each sample.

Figure 4:
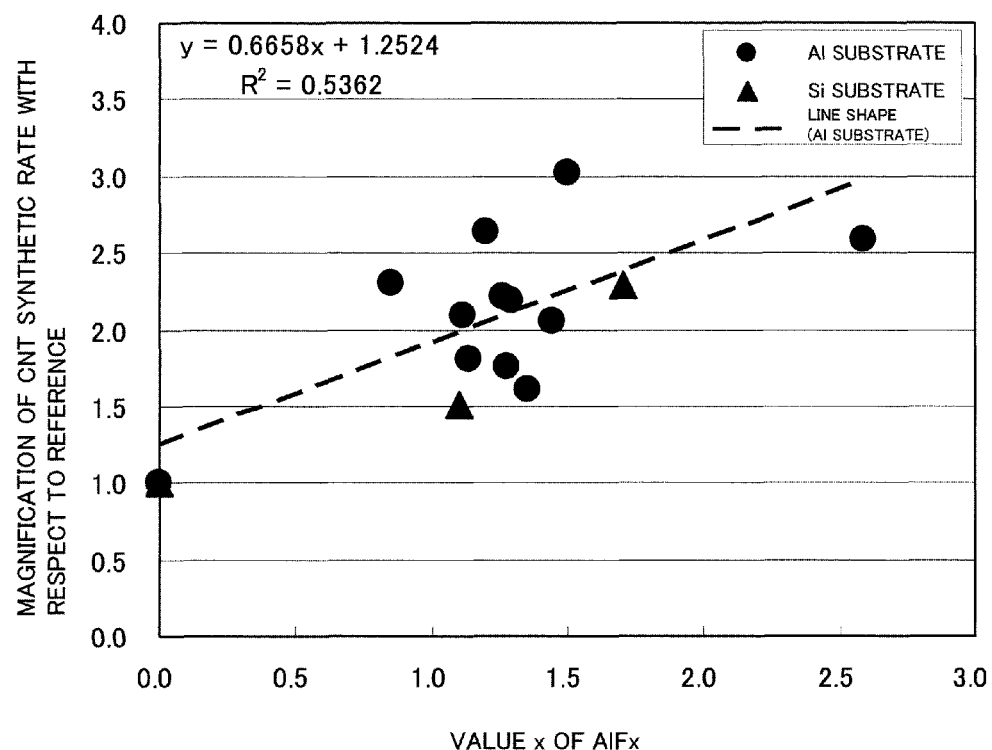
FIG. 4 is a graph showing the relation between a value x of $AlF_x$ in a buffer layer and a carbon nanotube synthetic rate.

FIG. 4 is a graph showing the relation between the value x of the buffer layer of each of Samples A to M and References 1 to 3 and the carbon nanotube synthetic rate. In FIG. 4, a horizontal axis denotes the value x of AlFx, and a vertical axis denotes the ratio of the CNT synthetic rate of each sample to the CNT synthetic rate of Reference. Since the fluorination treatment is not performed in References 1 to 3, the value x is 0.

As is clear from FIG. 4, as the value x of AlFx increases, the synthetic rate of the carbon nanotube increases. The synthetic rate of Example is about three times the synthetic rate of Comparative Example at most. Even in the case of the silicon substrate, the same result as in the case of the aluminum substrate is obtained. This means that the increase in the synthetic rate of the carbon nanotube does not depend on the type of the substrate main body. To be specific, the present invention is applicable to high melting point substrates.

As above, the synthetic rate of the carbon nanotube increases by providing the aluminum fluoride layer or the aluminum fluoride particles under the catalyst metal particles.

Reasons why the synthetic rate of the carbon nanotube has increased may be three reasons below.

1) High Heat Conductivity

The aluminum fluoride (AlFx) is higher in heat conductivity than the alumina ($Al_2O_3$). Therefore, even if the set heating temperature of the substrate holder is the same in the synthesis of the carbon nanotube, the catalyst metal particles on the aluminum fluoride layer become higher in temperature than the catalyst metal particles on the alumina layer. On this account, the synthetic rate increases.

2) Al—F Binding Stability

An Al—F binding energy is higher than an Al—O binding energy. Therefore, as compared to the alumina layer, the aluminum fluoride layer is less likely to be reduced in a reducing gas atmosphere in the synthesis of the carbon nanotube, so that the surface status thereof tends to be maintained. Thus, the agglomeration and deactivation of the catalyst metal particles on the surface of the aluminum fluoride layer are suppressed. On this account, the synthetic rate increases.

3) Actions of Fluorine Atoms Freed During Heating

A part of the aluminum fluoride layer is decomposed by the heating during the synthesis of the carbon nanotube. The fluorine atoms freed from the aluminum fluoride layer by this decomposition react with the amorphous carbon covering the catalyst metal particles to remove the amorphous carbon. Thus, the deactivation of the catalyst metal particles is suppressed. On this account, the synthetic rate increases.

Surface of Substrate Before and After Fluorination Treatment

Figure 5A:
FIG. 5(a) is an optical micrograph showing the surface of an aluminum substrate before a fluorination treatment.
Figure 5B:
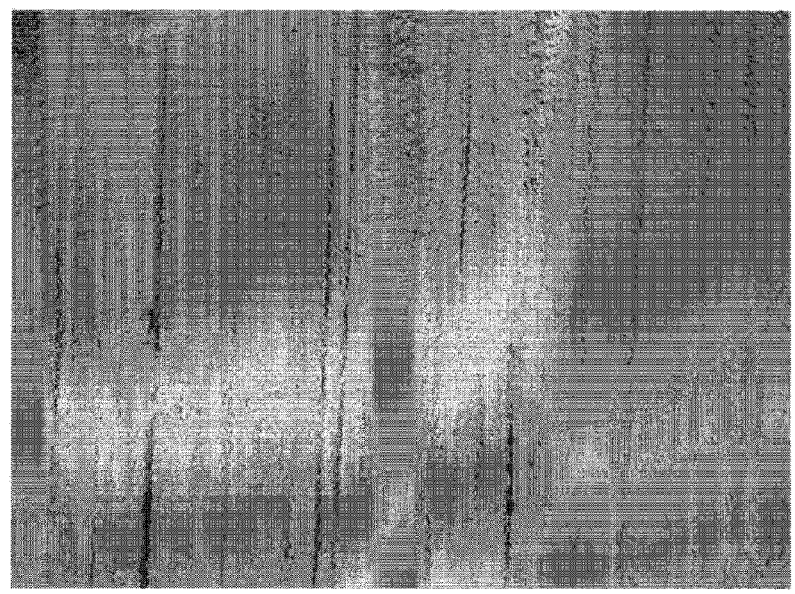
FIG. 5(b) is an optical micrograph showing the surface of the aluminum substrate after the fluorination treatment.

Before and after the fluorination treatment performed when producing each of the samples of Example, the surface of the aluminum substrate was observed with an optical microscope. FIG. 5(a) is an optical micrograph (at 20-fold magnification) showing the surface of the aluminum substrate before the fluorination treatment. FIG. 5(b) is an optical micrograph (at 20-fold magnification) showing the surface of the aluminum substrate after the fluorination treatment.

It is found from these micrographs that: regarding the surface of the aluminum substrate before the fluorination treatment, the number of roll marks derived from an aluminum substrate manufacturing step is large, and those marks are deep; but regarding the surface of the aluminum substrate after the fluorination treatment, since a part of the surface of the substrate is etched by the fluorination treatment, the roll marks become less prominent, and depressions and projections are reduced.

Difficulty of Peeling Off Carbon Nanotubes

Regarding the carbon nanotube complexes of Example and the carbon nanotube complexes of Comparative Example, the peel-off of the carbon nanotubes from the substrate using a cutter was attempted. As a result, obviously, in the carbon nanotube complex of Example, the strength of connection between the base of the carbon nanotube and the substrate was high, and the peel-off of the carbon nanotubes was more difficult.

A mechanism in which the peel-off of the carbon nanotubes became difficult by providing the aluminum fluoride layer or the aluminum fluoride particles is estimated as below.

Mechanism

Since the electronegativity (3.98 (electronegativity value of Pauling)) of F of AlFx is higher than the electronegativity (3.44) of O of $Al_2O_3$, the binding energy of the catalyst metal atom and the fluorine atom is higher than the binding energy of the catalyst metal atom and the oxygen atom. With this, it is estimated that the strength of binding of the catalyst metal particles and the buffer layer is high, and the peel-off of the carbon nanotubes from the complex becomes difficult.

Especially in a case where the substrate is made of aluminum, the roll marks derived from the aluminum substrate manufacturing step exist on the surface of the aluminum substrate as described above. However, it has been found that by forming the catalyst metal particles on the surface of the aluminum substrate, a large number of catalyst metal particles are formed on the depressions of the roll marks, and the catalyst metal particles are less likely to be formed on the projections of the roll marks.

However, in a case where the depressions and projections of the roll marks are reduced in the fluorination treatment as shown in FIG. 5(b), the catalyst metal particles are more uniformly formed on the surface of the aluminum substrate subjected to the fluorination treatment. As a result, it is thought that the carbon nanotubes are more uniformly arranged on the surface of the substrate, the carbon nanotubes support one another, and the peel-off of the carbon nanotubes as one carbon nanotube layer becomes difficult.

Measurement of Amount of Leakage Current

The carbon nanotube complex (Surface Area: 4 $cm^2$) of each of Example and Comparative Example was used as the electrode, and the amount of leakage current per unit capacity was measured. In this measurement, propylene carbonate was used as the solvent of the electrolytic solution, and 1.5M tetraethylammonium tetrafluoroborate (TEABF4) was used as the electrolyte of the electrolytic solution. Cellulose (Thickness: 35 μm) was used as the separator. The amount of leakage current was measured by changing an applied voltage using a potentiostep. An electrode potential with respect to an $Ag/Ag^+$ electrode was used as the applied voltage.

The weight of the carbon nanotubes was determined by the difference between a value obtained by measuring the substrate before the synthesis of the carbon nanotubes by an electronic balance and a value obtained by measuring the carbon nanotube complex after the synthesis of the carbon nanotubes by the electronic balance.

Figure 6:
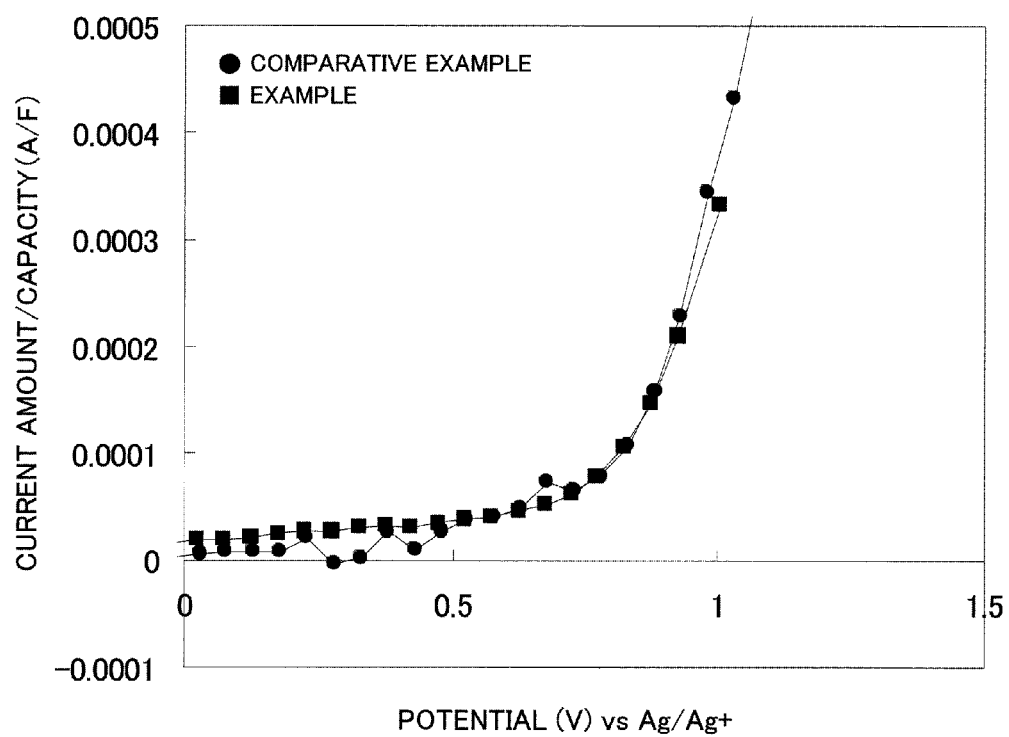
FIG. 6 is a graph showing the relation between an applied voltage and the amount of leakage current per unit capacity in Example and Comparative Example.

FIG. 6 shows the result. FIG. 6 is a graph showing the relation between the applied voltage (horizontal axis) and the amount of leakage current per unit capacity (vertical axis) in a case where the carbon nanotube complex of each of Example and Comparative Example is used as the electrode.

It is found from this result that the change in the amount of leakage current per unit capacity with respect to the applied voltage is approximately the same between Example and Comparative Example.

INDUSTRIAL APPLICABILITY

The present invention can provide the carbon nanotube complex which excels in durability and can be manufactured at low cost. By using the carbon nanotube complex as the electrode body in the energy device and incorporating the energy device in the electronic device or the transporting device, it is possible to provide at low cost the energy device, the electronic device, and the transporting device, each of which excels in durability.

REFERENCE SIGNS LIST 10 carbon nanotube complex
11 carbon nanotube
12 catalyst metal particles
13 buffer layer
14 substrate main body
20 energy device
21 energy device element
22 anode lead wire
23 anode
24 cathode lead wire
25 cathode
26 separator
27 sealing member
28 metal case
30 mobile phone
40 automobile

The invention claimed is:

1. A carbon nanotube complex comprising:
a substrate main body;
a buffer layer formed on at least one of surfaces of the substrate main body and including aluminum atoms and fluorine atoms; and
a plurality of carbon nanotubes, each having one end connected to a surface of the buffer layer.

2. The carbon nanotube complex according to claim 1, wherein the buffer layer is constituted by an aluminum fluoride layer or aluminum fluoride particles.

3. The carbon nanotube complex according to claim 2, wherein the aluminum fluoride layer or the aluminum fluoride particles has a composition represented by a formula: $AlF_x$ (where x satisfies $0<x<3.9$).

4. The carbon nanotube complex according to claim 1, wherein the substrate main body is made of aluminum.

5. An energy device comprising at least a pair of electrode bodies constituted by a positive electrode and a negative electrode, wherein
at least one of the positive electrode and the negative electrode is the carbon nanotube complex according to claim 1.

6. The energy device according to claim 5, wherein the substrate main body is made of aluminum.

7. The energy device according to claim 5, wherein the energy device is an electric double layer capacitor, a pseudo capacitor, a lithium ion capacitor, or a lithium ion secondary battery.

8. An electronic device comprising the energy device according to claim 5.

9. A transporting device comprising the energy device according to claim 5.

10. A method for manufacturing a carbon nanotube complex, comprising the steps of:
forming an aluminum fluoride layer or aluminum fluoride particles on at least one of surfaces of a substrate main body;
forming catalyst metal particles on a surface of the aluminum fluoride layer or on surfaces of the aluminum fluoride particles; and
synthesizing carbon nanotubes by using the catalyst metal particles as origins.

11. The method according to claim 10, wherein the aluminum fluoride layer or the aluminum fluoride particles has a composition represented by a formula: $AlF_x$ (where x satisfies $0<x<3.9$).

12. A method for manufacturing an energy device, comprising the steps of:
forming an aluminum fluoride layer or aluminum fluoride particles on at least one of surfaces of a substrate main body;
forming catalyst metal particles on a surface of the aluminum fluoride layer or on surfaces of the aluminum fluoride particles;
synthesizing carbon nanotubes by using the catalyst metal particles as origins to produce a carbon nanotube complex;
producing an element by stacking or rolling a positive electrode and a negative electrode with a separator interposed therebetween, the positive electrode and the negative electrode being opposed to each other, at least one of the positive electrode and the negative electrode being the carbon nanotube complex;
storing the element in a case together with a driving electrolytic solution; and
sealing an opening of the case.

13. The method according to claim 12, wherein the aluminum fluoride layer or the aluminum fluoride particles has a composition represented by a formula: $AlF_x$ (where x satisfies $0<x<3.9$).

* * * * *